(12) United States Patent
Kim

(10) Patent No.: US 7,787,140 B2
(45) Date of Patent: Aug. 31, 2010

(54) PRINTING SYSTEM AND METHOD OF PRINTING DATA ON A DESIGNATED PAPER

(75) Inventor: Hyuck Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1261 days.

(21) Appl. No.: 11/334,382

(22) Filed: Jan. 19, 2006

(65) Prior Publication Data
US 2006/0164680 A1 Jul. 27, 2006

(30) Foreign Application Priority Data
Jan. 25, 2005 (KR) ...................... 10-2005-0006557

(51) Int. Cl.
*G06F 15/00* (2006.01)
*G03G 15/00* (2006.01)
(52) U.S. Cl. ....................................... 358/1.15; 399/18
(58) Field of Classification Search ................ 358/1.15, 358/1.16, 1.13, 1.14, 1.18, 1.6, 2.6, 1.1, 2.1, 358/448, 3.26, 504, 296; 399/79, 18, 23, 399/81, 19, 21; 400/61, 63, 70, 76; 718/102, 718/101, 104, 106, 108; 709/206, 229, 223, 709/226, 215; 715/839, 208, 769, 773
See application file for complete search history.

(56) References Cited

U.S. PATENT DOCUMENTS 6,213,652 B1 * 4/2001 Suzuki et al. .............. 358/1.15

2001/0012122 A1 * 8/2001 Ueda ........................ 358/1.15
2005/0073696 A1 * 4/2005 Mackenzie et al. ........... 358/1.6

FOREIGN PATENT DOCUMENTS

| JP | 5-270075 | 10/1993 |
| JP | 8-192932 | 7/1996 |
| JP | 11-078170 | 3/1999 |
| JP | 2000-343790 | 12/2000 |
| KR | 2001-47493 | 6/2001 |

OTHER PUBLICATIONS

Korean Office Action dated May 23, 2006 issued in KR 2005-6557.

* cited by examiner

*Primary Examiner*—Saeid Ebrahimi Dehkordy
(74) *Attorney, Agent, or Firm*—Stanzione & Kim, LLP

(57) ABSTRACT

A printing system which includes a printer connected with at least one user terminal by a wire or wirelessly to print printing data transmitted from the user terminal, prevents printing of data before a special printing job and a printing method for the same. In the printing system, the user terminal connectable with the printer includes a printer driver to set a pause mode to temporarily prevent a printing operation in the printer, and a monitoring program unit to monitor an operation status of the printer and to display information supplied from the printer on the pause-set printing data. The printer includes a control unit to inform the user terminal the pause-set printing data is printed, upon receiving the pause-set printing data and to control second printing data supplied from a second user terminal to stand by.

10 Claims, 4 Drawing Sheets

PRINTING SYSTEM AND METHOD OF PRINTING DATA ON A DESIGNATED PAPER

CROSS-REFERENCE TO RELATED APPLICATIONS

This application claims benefit under 35 U.S.C. §119(a) from Korean Patent Application No. 2005-6557, filed in the Korean Intellectual Property Office on Jan. 25, 2005, the entire contents of which are incorporated herein by reference.

BACKGROUND OF THE INVENTION

1. Field of the Invention

The present general inventive concept relates to a printing system and a printing method. More particularly, the present general inventive concept relates to a printing system which, when a special printing job, for example, printing printing data on a designated paper, is required by a user, prevents other printing data ordered by other users from being printed ahead of the special printing job, thereby improving a convenience of a printing operation and saving time and resources for the printing operation, and a printing method thereof.

2. Description of the Related Art

In a conventional network printer shared by a plurality of users, it is inconvenient when one of the users wants to perform printing under a special condition other than a general condition.

For example, in order to print printing data on a special paper, such as an envelop, an overhead projector (OHP) film, a B5 paper and a color paper, first, the user goes to the printer to set the special paper in a paper cartridge and returns to the user's computer to transmit the printing data to the printer. However, while the user, who has set the special paper in the paper cartridge, is coming back to the computer, another user may transmit another printing data, so that the another printing data is printed on the special paper instead of printing the printing data on the special paper. As a result, both users have to repeat the respective printing after setting again an appropriate paper. This situation disturbs favorable printing and causes a waste of time and resources.

In order to prevent this situation, recent printers are equipped with a hard disc for saving or storing the printing data. Therefore, when transmitting the printing data, a user can select a function of saving or storing the printing data in the printer. Then, the user sets the special paper in the printer and orders printing and selecting the printing data through a display of the printer. However, there still exists a problem that another user may transmit another printing data while the user, who has transmitted the printing data first, is setting the special paper and searching for the stored data through the display. Since the another user's printing data can be printed on the special paper, even the printer capable of saving the printing data cannot completely solve the above described problem.

Furthermore, when a user stores the printing data using the printer capable of saving the printing data and moves to the printer, if the printer has already received a plurality of other printing data from other users, the user has to wait until the other data are all printed. Therefore, the user has to wait for printing of the stored data and also, other users' data still can interrupt while printing the stored data.

As a result, it is necessary to provide a solution for the problems caused when printing under a special condition is performed, to thereby improve efficiency of a printing operation and to prevent the waste of time and resources.

SUMMARY OF THE INVENTION

The present general inventive concept provides a printing system which, when a special printing job, for example, printing printing data on a special paper is required by a user, prevents other printing data ordered by other users from being printed ahead of the special printing job, thereby improving a convenience of a printing operation and saving time and resources for the printing operation, and a printing method thereof.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a printing system which includes a printer connectable with at least one user terminal by a wire or wirelessly to print printing data transmitted from the at least one user terminal, the printing system comprising the at least one user terminal connectable with the printer and having a printer driver to set a pause mode to temporarily prevent a printing operation of the printing data in the printer, and a monitoring unit to monitor an operation status of the printer and to display information on pause-set printing data supplied from the printer according to the pause mode, wherein the printer comprises a control unit to inform the at least one user terminal of information on when the pause-set printing data is printed, upon receiving the pause-set printing data, and to control second printing data supplied from a second user terminal to stand by until the printing of the pause-set printing data is completed or a predetermined time lapses.

When a printing command is input by a user within a predetermined waiting time after informing the at least one terminal of a time to print the pause-set printing data, the control unit may control to print the pause-set printing data.

The control unit may determine whether the second printing data exists, after the predetermined waiting time.

When the second printing data exists, the control unit may print a preset number of the second printing data.

When the second printing data are printed, the control unit may inform the at least one user terminal of the time to print the pause-set printing data.

When the second printing data does not exist, the control unit may inform the at least one user terminal of the time to print the pause-set printing data.

After printing the second printing data, the control unit may inform the at least one user terminal of the time to print the pause-set printing data and after the predetermined time, counts the predetermined number of repetitions of serial processes of waiting for the predetermined waiting time and printing the second printing data.

When the serial processes are repeated the predetermined number of repetitions, the control unit may delete the printing data.

When the serial processes are repeated the predetermined number of repetitions, the control unit may store the printing data in a memory.

The printing system may further comprise a counter to count the number of the second printing data and the predetermined number of repetitions.

The foregoing and/or other aspects of the present general inventive concept may also be achieved by providing a printing method in a printing system having a printer connected with at least one user terminal by a wire or wirelessly to print printing data transmitted from the at least one user terminal, the method comprising setting a pause mode in the at least one user terminal to temporarily prevent a printing operation, determining whether pause-set printing data is received by the printer, informing the user terminal of a time to print the pause-set printing data, and controlling other printing data supplied from a second user terminal connected to the printer to stand by until a predetermined waiting time elapses.

The foregoing and/or other aspects of the present general inventive concept may also be achieved by providing a printing system to print printing data including a terminal to transmit printing data to be printed, to select a pause mode with respect to the printing data, to transmit information on the pause mode with respect to the printing data, and to prevent the transmitted printing data from being printed until a specific printing command is input.

The foregoing and/or other aspects of the present general inventive concept may also be achieved by providing a printing system to print printing data comprising a terminal to generate a pause mode with respect to printing data through a printing menu window, and to prevent the printing data from being printed until a predetermined period of time elapses.

The foregoing and/or other aspects of the present general inventive concept may also be achieved by providing a printing system to print printing data, comprising a first terminal to transmit first printing data to be printed on a first paper according to a pause mode with respect to the first printing data, to prevent the first printing data to be printed until a specific printing command is input after the first printing data has been transmitted, and a second terminal to transmit second printing data to be printed on a second paper without the pause mode, wherein the second printing data is prevented from being printed until the first printing data is printed.

The foregoing and/or other aspects of the present general inventive concept may also be achieved by providing a printing system to print printing data comprising a printer to receive first printing data having a pause mode to prevent the first printing data from being printed until a specific printing command is input, to receive second printing data between a first time in which the pause mode is received and a second time in which the specific printing command is input, and to prevent the second printing data from being printed until the first printing data is printed.

The foregoing and/or other aspects of the present general inventive concept may also be achieved by providing a printing system to print printing data comprising a printer to receive first printing data to be printed on a first paper and second printing data to be printed on a second paper, and to prevent the second printing data from being printed until the first printing data is printed according to a type of the first paper and the second paper.

The foregoing and/or other aspects of the present general inventive concept may also be achieved by providing a printing system to print printing data comprising a printer to receive first printing data to be printed on a first paper and second printing data to be printed on a second paper, and to prevent the second printing data from being printed on the first paper until the first printing data is printed according to a type of the first paper and the second paper.

The foregoing and/or other aspects of the present general inventive concept may also be achieved by providing a printing system to print printing data comprising a printer to receive first printing data to be printed on a first paper which is not loaded in the printer, to receive second printing data to be printed on a second paper and to prevent the second printing data from being printed onto the first paper when the first paper is loaded thereon.

The foregoing and/or other aspects of the present general inventive concept may also be achieved by providing a printing system to print printing data comprising a terminal to transmit printing data to be printed, to select a pause mode with respect to the printing data, to prevent the transmitted printing data from being printed until a specific printing command is input, and to transmit information on the pause mode with respect to the printing data, and a printer to receive the printing data having the information on the pause mode to prevent the printing data from being printed until the specific printing command is input, to receive second printing data between a first time in which the information on the pause mode is received and a second time in which the specific printing command is input, and to prevent the second printing data from being printed according to a determination of whether a predetermined period of time lapses or the first printing data is printed.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
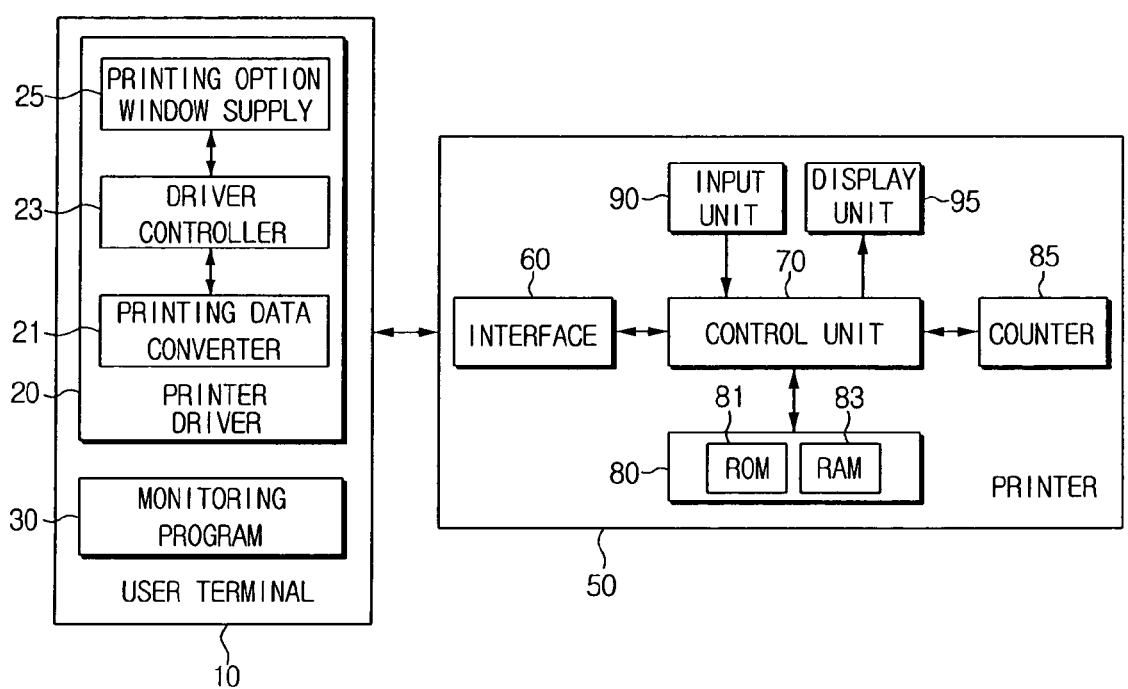
FIG. 1 is a block diagram illustrating a printing system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a printing system according to an embodiment of the present general inventive concept. The printing system comprises a plurality of user terminals 10, and a printer 50 communicably connected with the user terminals 10 through a network to pause a printing operation of printing data received from the user terminal 10 according to a user's selection. FIG. 1 shows only one user terminal 10 as an example. However, the plurality of user terminals 10 can be connected to the printer 50.

The network, herein, refers to almost all types of communication networks that can be connected wirelessly or by a wire. Such a network may comprise the Internet, a local area network (LAN), a wide area network (WAN), a network formed of LANs of a same type or similar types connected through bridges, a network formed of LANs of different types connected through gateways, and a wireless network such as Bluetooth. The network may further comprise a local interface, such as a universal serial bus (USB) interface and a parallel interface.

The user terminal 10 connected to the printer 50 through the network comprises a printer driver 20 and a monitoring program unit 30 to monitor the printing operation of the printing data prepared in an application program.

The printer driver 20 converts the printing data prepared in an application program of the user terminal 10 to a printer language (hereinbelow, referred to as 'printer controlling language') interpretable by the printer 50. The printer controlling language refers to word instructions transmitted from the user terminal 10 to the printer 50. The word instructions of the printer controlling language manage a character size, a graphic, a character style, a compression of data transmitted to the printer 50, and a color. Usually, a postscript language and a printer control language (PCL) are used for the printer controlling language.

The printing data converted to the printer controlling language by the printer driver 20 may be temporarily stored in a spooler. The printing data as converted to the printer controlling language may be supplied to the printer 50 to be stored in the spooler, before being printed.

The printer driver 20 comprises a printing option window supply 25, a printing data converter 21, and a driver controller 23.

Figure 2:
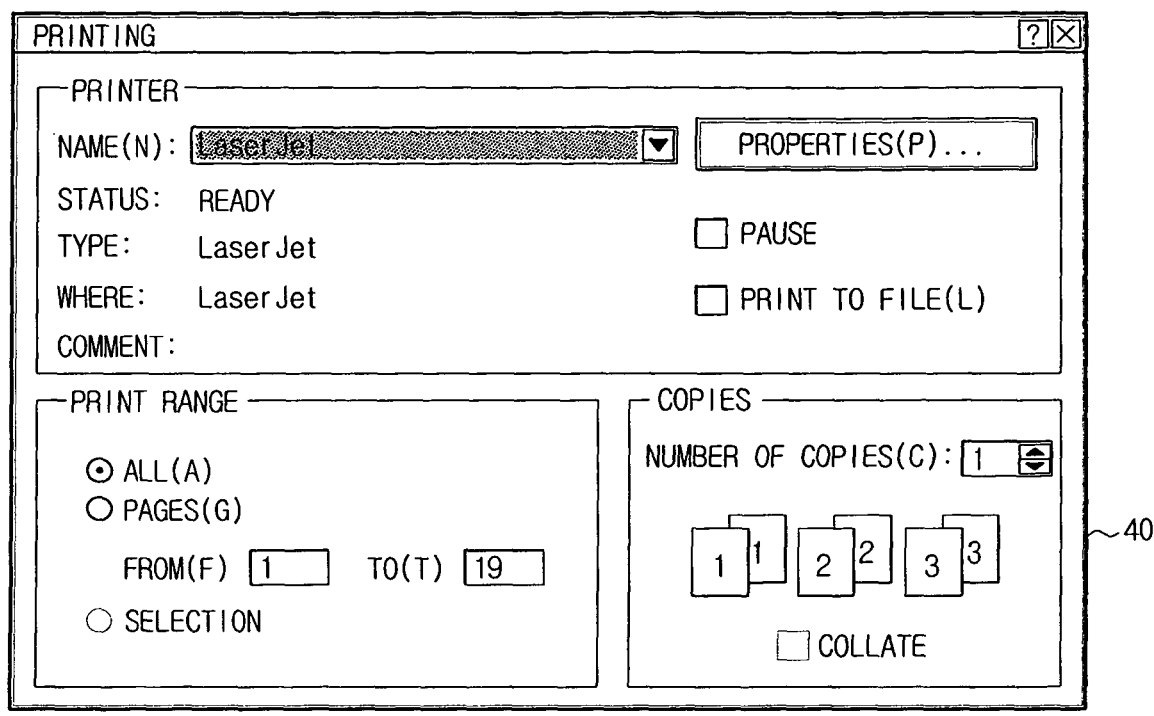
FIG. 2 illustrates a window to set options of a printing work in the printing system of FIG. 1.

The printing option window supply 25 may display a printing option window through a display part of the user terminal 10. As illustrated in FIG. 2, the printing option window 40 displays menus having a menu option to select a pause function (mode) "PAUSE" with respect to the printing data. When the pause function is set on the printing data (hereinafter, referred to as pause-set printing data) by the user, the pause-set printing data can be temporarily prevented from being printed until the user inputs a specific printing command to print the pause-set printing data although the pause-set printing data is to be printed according to a printing order. Therefore, when the user wants to print the printing data on a special (designated) paper, such as an envelop, a color paper, a B5 paper, a one-side-used paper, an overhead projector (OHP) film and a sensitized paper, other than a general-purpose paper usually set in the printer, the pause function prevents other printing data of other user terminals 10 from being printed before the pause-set printing data is printed on the special paper.

The printing data converter 21 converts the printing data to the printer controlling language. During this conversion, the printing data converter 21 may also convert information on the pause function set by the user through the printing option window 40 so that the information on the pause function can be supplied to the printer 50.

The driver controller 23 controls an operation of the printer driver 20 and supplies the information on the pause function set through the printing option window 40 to the printing data converter 21 so as to convert the information on the pause function to the printer controlling language together with the printing data.

The monitoring program unit 30 monitors an operation status of the printer 50 through a two-way communication with the printer 50 and displays the operation status on the user terminal 10. A status monitor or a general messenger program may be used for the monitoring program unit 30. More specifically, for example, the monitoring program unit 30 may display on the user terminal 10 whether the printing data transmitted by the user is received by the printer 50 and whether the printing data transmitted by the user is to be printed.

Referring to FIG. 1, the printer 50 comprises an input unit 90, a display unit 95, an interface 60, a storage unit 80, a counter 85, and a control unit 70.

The input unit 90 has a plurality of buttons to select various functions performed by the printer 50. The user can print the pause-set printing data by operating the input unit 90.

The display unit 95 displays the operation status of the printer 50 according to the user's input through the input unit 90 or a control by the control unit 70. The display unit 95 may also display a message representing that the pause-set printing data is to be printed. When the user operates the input unit 90, the display unit 95 may display a menu to select the printing operations of the pause-set printing data.

The interface 60 enables a connection between the printer 50 and the user terminal 10 and performs the two-way communication between the user terminal 10 and the control unit 70.

The storage unit 80, comprising a read-only memory (ROM) 81 and a random access memory (RAM) 83, stores various programs to operate the printer 50 and the printing data. The ROM 83 is a non-volatile memory to store diverse controlling programs to implement functions of the printer 50 and information regarding the printer 50.

The RAM 83 stores the pause-set printing data transmitted from the user terminal 10 and other data generated during the operation of the printer 50. Additionally, when the pause function is set with respect to the printing data, the RAM 83 stores information on a waiting time, which is a time to wait for the user's input to command the printing operation for the pause-set printing data, and information on the number of latter-order printing data (second printing data) to be printed ahead of the pause-set printing data after the waiting time. The latter-order printing data is the second printing data sent to the printer 50 from another one of the plurality of user terminals 10 after sending the pause-set printing data from user terminal 10 to the printer 50. Moreover, the RAM 83 stores information on the number of repetitions of serial processes relating to the second printing data. The serial processes are the processes of printing the second printing data after the waiting time when the second printing data may be printed before the pause-set printing data. The RAM 83 further stores information on whether to keep or to delete the pause-set printing data if there is still no input of the specific printing command from the user to command the printing of the pause-set printing data even after repeating the serial processes according to the number of repetitions of the serial processes.

Here, the waiting time should be long enough for the user to go to the printer 50, set the specifically designated paper in the printer 50, and input the specific printing command for the printing of the pause-set printing data through the input unit 90. The waiting time may be preset by a manufacturer or set by the user according to a working environment. The number of latter-order printing data and the number of repetitions of the serial processes may also be preset by the manufacturer or set by the user. A time required to print the latter-order printing data may be set instead of the number of the latter-order printing data. After repeating the serial processes a number of repetitions times, the printing data may be kept in the RAM 83 or may be deleted according to a user's selection.

When the printing data transmitted from the user terminal 10 includes the information on the pause function, the counter 85 controlled by the control unit 70 counts the waiting time that has been previously set until the pause-set printing data is to be printed. If no specific printing command to print the pause-set printing data is input by the user during the waiting time, the counter 85 counts the number of the latter-order printing data to be printed ahead of the pause-set printing data. After the latter-order printing data are printed, if no specific printing command to print the pause-set printing data is input by the user, the counter 85 counts the number of repetitions of the serial processes of printing of the latter-order printing data. It is possible that the latter-order printing data is printed when the specifically designated paper for the pause-set printing data is set in the printer 50. If the specifically designated paper is set in the printer 50, the latter-order printing data may be prevented from being printed.

Figure 3:
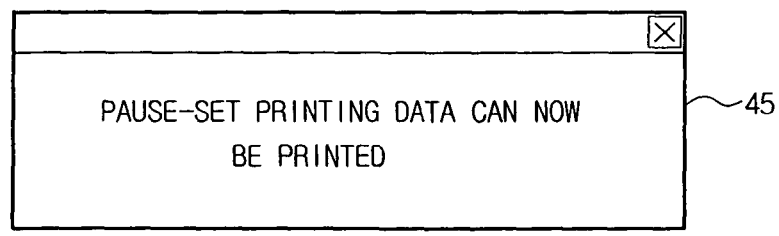
FIG. 3 illustrates a pop-up window displayed on a user terminal to inform that printing data is now enabled to be printed in the printing system of FIG. 1.
Figure 4A:
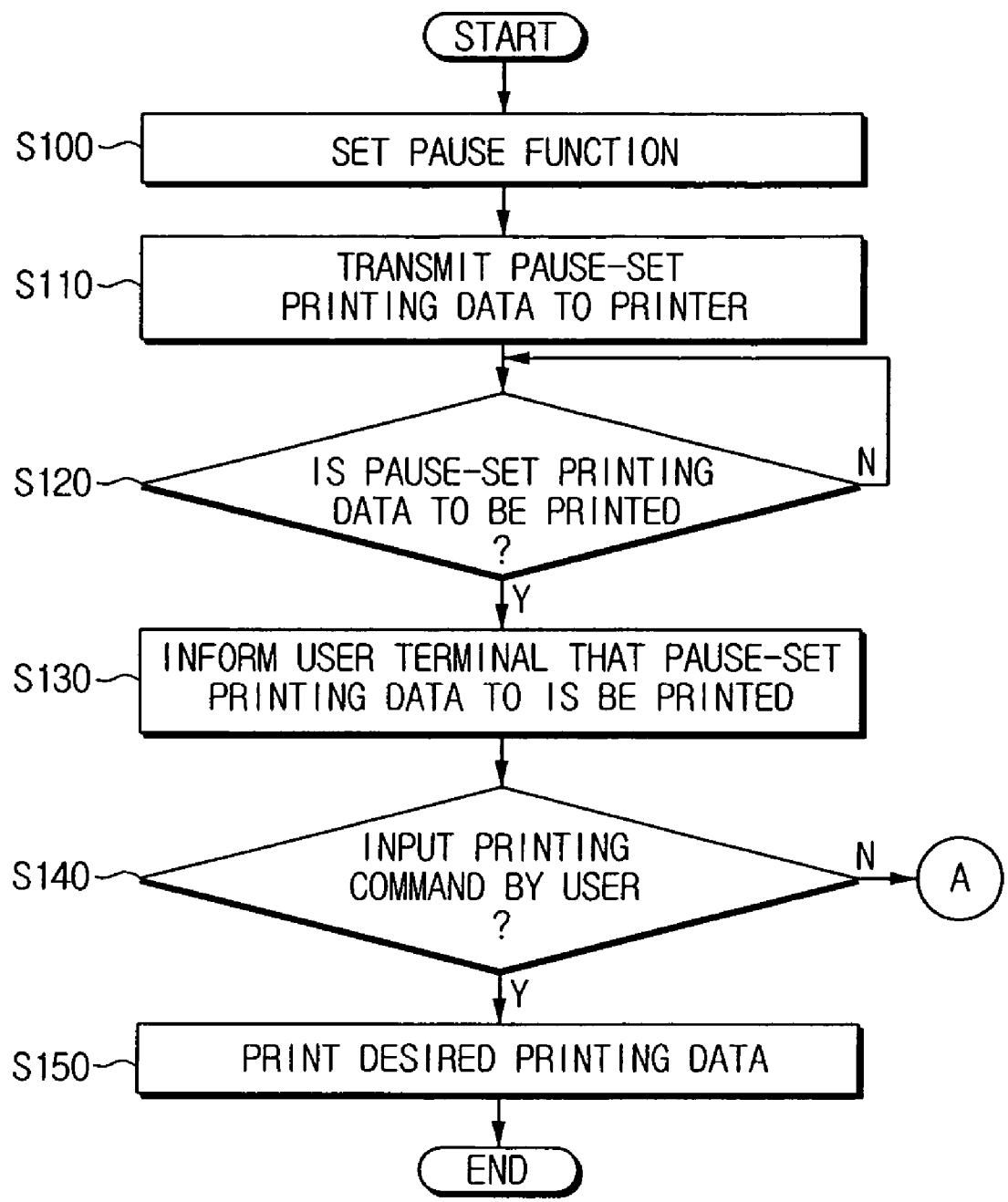
FIGS. 4A and 4B are flowcharts illustrating printing processes according to an embodiment of the present general inventive concept.
Figure 4B:
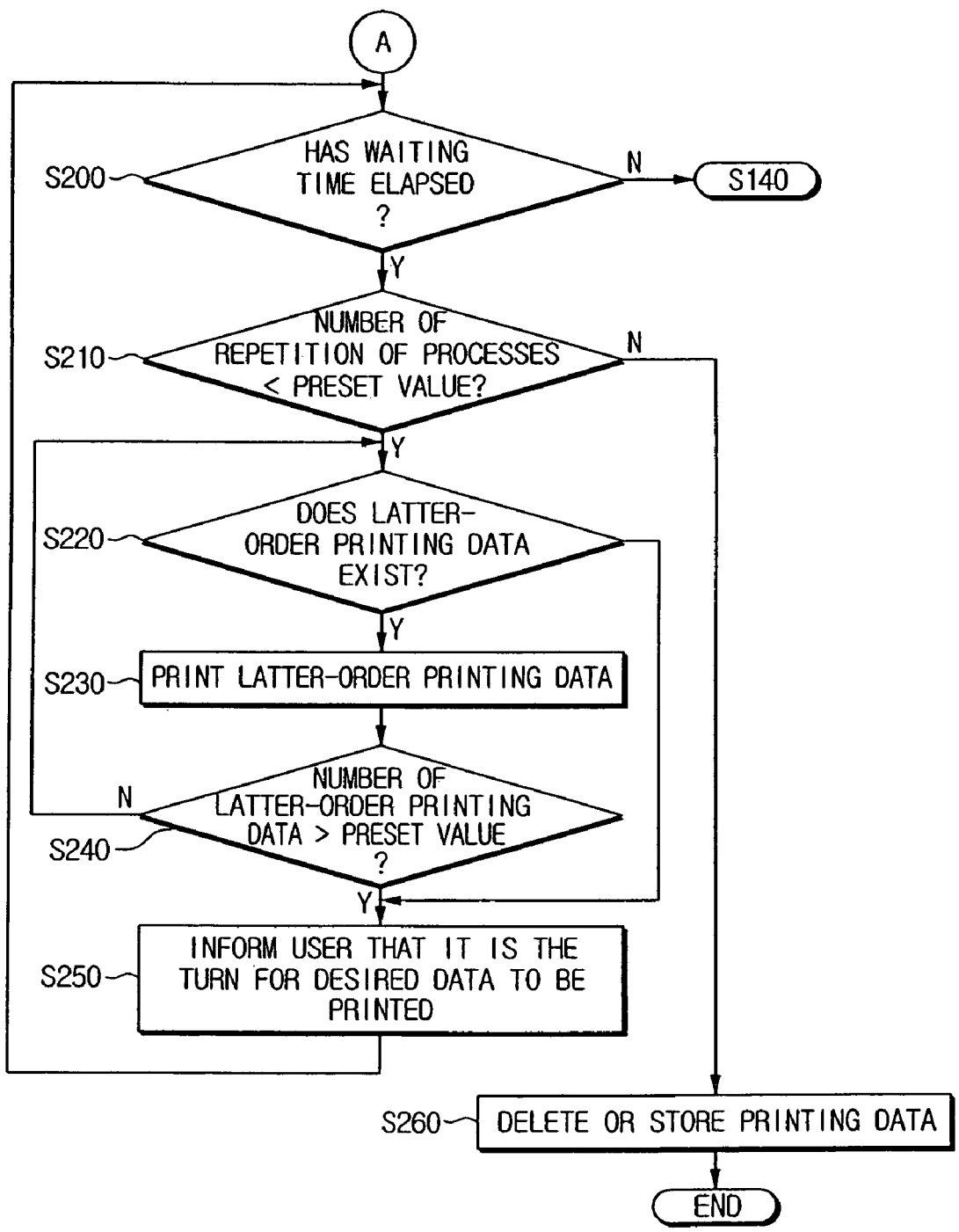

Upon receiving the printing data from the user terminal 10, the control unit 70 determines whether the received printing data includes the information on the pause function, that is, the received printing data is the pause-set printing data. When it is determined to print the received printing data which includes the information on the pause function, the control unit 70 informs the monitoring program unit 30 of the determination. Then, the user terminal 10 displays a pop-up message 45 informing that the pause-set printing data can be printed, as illustrated in FIG. 3. At this time, the control unit 70 interrupts the printing of the latter-order printing data supplied from another user terminal 10 and operates the counter 85 to determine whether the specific printing command to print the pause-set printing data is input by the user through the input unit 90 within the waiting time. When the specific printing command to print the pause-set printing data is input within the waiting time, the control unit 70 prints the pause-set printing data. If there is no specific printing command input within the waiting time, the control unit 70 prints the latter-order printing data before printing the pause-set printing data. After the latter-order printing data is printed, the control unit 70 supplies the pop-up message 45 informing that the pause-set printing data can be printed, to the user terminal 10 through the monitoring program unit 30. If no specific printing command is input by the user while repeating the above processes a predetermined number of times, the control unit 70 may store or delete the printing data according to a predetermined command set by the manufacturer or the user.

Hereinbelow, the processes of printing the pause-set printing data in the above-structured printing system will be described with reference to FIGS. 1, 2, 4A, and 4B.

In order to print the printing data on the special paper (specifically designated paper) other than the general-purpose paper, the user first selects the pause function through the printing option window 40 (operation S100). When converting the printing data to the printer controlling language, the printer driver 20 of the user terminal 10 also converts the information on the pause function to the printer controlling language and includes the converted information in the printing data. When the printing data is supplied to the printer 50 (operation S110), the control unit 70 of the printer 50 determines whether the received printing data includes the information on the pause function. The printing data converted to the printer controlling language including information on the pause function is referred to as the pause-set printing data.

If the control unit determines that the received printing data includes the information on the pause function, that is, the pause-set printing data, when the pause-set printing data can be printed (operation S120), the control unit 70 informs the user terminal 10 through the monitoring program unit 30 and may simultaneously operate the counter 85 to count the waiting time (operation S130). Therefore, as illustrated in FIG. 3, the pop-up message 45 is activated to inform that the pause-set printing data can be printed. Then the user goes to the printer 50 to set the special paper in a paper cartridge and selects the pause-set printing data through the input unit 90 to be printed. When the specific printing command to print the pause-set printing data is thus input by the user (operation S140), the control unit 70 controls other printing data input from other user terminals to stand by, thereby preventing the other printing data from being printed, and controls the pause-set printing data to be printed (operation S150).

If the waiting time has elapsed according to the counter 85 (operation S200) and the user has not input the specific printing command to print the pause-set printing data through the input unit 90, the control unit 70 determines whether a repetition number of the operations S140 to S250 exceeds a preset value (operation S210). When the repetition number does not exceed the preset value, for example, 3, the control unit 70 determines whether the latter-order printing data exists (operation S220). When the repetition number exceeds the preset value, the control unit 70 deletes or stores the pause-set printing data in the RAM 83 according to preset information (operation S260).

When the latter-order printing data exists in the operation S220, the control unit 70 prints in advance according to the number of the latter-order printing data previously set (operation S230). When the number of printed latter-order data exceeds the preset value (operation S240), the control unit 70 informs the user terminal 10 that the pause-set printing data can be printed (operation S250) and operates the counter 85 to wait until the waiting time elapses.

When the latter-order data does not exist in the operation S220, the control unit 70 informs the user terminal 10 that the pause-set printing data can be printed (operation S250) immediately or after a predetermined time, and waits until the waiting time elapsed.

When the waiting time has elapsed, the control unit 70 checks whether the repetition number of the operations S140 to S250 exceeds the preset value (operation S210) to determine whether to further repeat the operations S140 to S250 and whether to delete or store in the RAM 83 the pause-set printing data. If the pause-set printing data is stored in the RAM 83, the user is able to print the pause-set printing data later.

As described above, the printer 50 is connected with a plurality of user terminals 10 to receive first printing data corresponding to the printing data and second printing data corresponding to latter-order printing data transmitted to the printer 50 between a first time in which the first printing data or the pause mode with respect to the printing data is transmitted to the printer 50, and a second time in which the specifically designated paper for the first printing data is set in the printer 50 or the specific printing command is input after the specifically designated paper has been set. In the printing system according to an embodiment of the present general inventive concept, if the user wants to print the printing data according to a special condition, such as using the specifically designated paper, the user can select the pause function with respect to the printing data. When the pause-set printing data can be printed, the printer 50 informs the user terminal 10 that it is the time to print the printing data and waits a waiting time to allow the user to print out the printing data on the specifically designated paper. When the user can not perform printing within the waiting time, some latter-order printing data are printed in advance and the printer enables again the printing data to be printed.

Accordingly, the user can be aware of a printing order so that the user can appropriately print the printing data on the specifically designated paper. That is, since the latter-order printing data input from the other user terminals 10 can be prevented from being printed ahead of the printing data, an efficiency of a printing operation can be improved by saving time and resources.

Moreover, since the user terminal 10 is notified that it is the time to print the printing data, the user does not have to wait to set the specifically designated paper. Therefore, the user is able to do other jobs during the waiting time, thereby enhancing work efficiency and reducing a mental stress and a waste of time.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing system which includes a printer to print printing data, the printing system comprising:
   at least one user terminal connectable with a printer and having a printer driver to set a pause mode to temporarily prevent the printer from performing printing operations, and a monitoring unit to monitor an operation status of the printer and to display information on pause-set printing data supplied from the printer according to the pause mode,
   wherein the printer comprises a control unit to inform the at least one user terminal of information on when the pause-set printing data is printed, upon receiving the pause-set printing data, and to control second printing data supplied from a second user terminal to stand by.

2. The printing system of claim 1, wherein when a printing command is input by the user within a predetermined waiting time after informing the at least one terminal of a time to print the pause-set printing data , the control unit controls to print the pause-set printing data.

3. The printing system of claim 2, wherein the control unit determines whether the second printing data exists, after the predetermined waiting time.

4. The printing system of claim 3, wherein, when the second printing data exists, the control unit prints a preset number of the second printing data.

5. The printing system of claim 4, wherein, when the second printing data is printed, the control unit informs the at least one user terminal of the time to print the pause-set printing data.

6. The printing system of claim 4, wherein, when the second printing data does not exist, the control unit informs the at least one user terminal of the time to print the pause-set printing data.

7. The printing system of claim 5, wherein, after printing the second printing data, the control unit informs the at least one user terminal of the time to print the pause-set printing data, and after a predetermined time, counts a predetermined number of repetitions of serial processes of waiting for the predetermined waiting time and printing the second printing data.

8. The printing system of claim 7, wherein, after the serial processes are repeated the predetermined number of repetitions, the control unit deletes the printing data.

9. The printing system of claim 7, wherein, after the serial processes are repeated the predetermined number of repetitions, the control unit stores the printing data in a memory.

10. The printing system of claim 7, further comprising:
    a counter to count the preset number of the latter-order printing data and the predetermined number of repetitions.

* * * * *